United States Patent [19]
Plunkett

[11] Patent Number: 5,896,876
[45] Date of Patent: Apr. 27, 1999

[54] METHOD AND APPARATUS FOR DECONTAMINATION OF POLY CHLORINATED BIPHENYL CONTAMINATED SOIL

[76] Inventor: Erle L. Plunkett, P.O. Box 87, Supply, N.C. 28462

[21] Appl. No.: 09/042,689

[22] Filed: Mar. 17, 1998

Related U.S. Application Data

[62] Division of application No. 08/758,737, Dec. 6, 1996, Pat. No. 5,779,813.
[51] Int. Cl.[6] .................................................. B08B 3/04
[52] U.S. Cl. .......................... 134/109; 134/111; 134/201; 134/132; 134/65
[58] Field of Search .................. 134/12, 109, 65, 134/131, 111, 132, 105, 61, 66, 133, 134, 201; 405/128

[56] References Cited

U.S. PATENT DOCUMENTS

| | | |
|---|---|---|
| 3,152,979 | 10/1964 | Bichard et al. . |
| 4,678,558 | 7/1987 | Belluteau et al. . |
| 4,869,825 | 9/1989 | Steiner . |
| 5,255,859 | 10/1993 | Peacock et al. . |
| 5,288,330 | 2/1994 | Ballard et al. . |
| 5,340,406 | 8/1994 | Fearon . |
| 5,413,129 | 5/1995 | Shenoi ........................... 134/105 |
| 5,423,340 | 6/1995 | Campbell et al. ............... 134/201 |
| 5,439,597 | 8/1995 | Allen . |
| 5,507,953 | 4/1996 | Machlitt et al. . |
| 5,637,162 | 6/1997 | Robinson et al. . |

*Primary Examiner*—Frankie L. Stinson
*Attorney, Agent, or Firm*—Robert N. Blackmon

[57] ABSTRACT

A method and apparatus is provides for decontamination of soil from contaminates such as polychlorinated biphenyls. The method involves (a) admixing a short chain alcohol and a long chain alcohol to provide a solvent composition, (b) admixing the solvent composition with the contaminated soil to extract the contaminant from the soil into the solvent to form contaminated solvent, (c) separating the soil from the contaminated solvent, (d) washing of the decontaminated soil with water to remove residual solvent from the soil, and (e) distillation of the contaminated solvent to separate the reusable short chain alcohol as a light fraction from a heavy fraction containing the long chain alcohol and the contaminant. The apparatus includes (a) a mixer for mixing the soil and solvent, (b) a centrifuge for separating fines from decanted contaminated solvent, (c) a distillation unit for separating the solvent into a reusable light fraction and a waste heavy fraction, and (d) a water reclamation unit for removing residual solvent from the wash water. The method and apparatus are usable for reclaiming contaminated soils.

2 Claims, 3 Drawing Sheets

METHOD AND APPARATUS FOR DECONTAMINATION OF POLY CHLORINATED BIPHENYL CONTAMINATED SOIL

This is a divisional application of U.S. patent application Ser. No. 08/758,737 filed on Dec. 6, 1996 now U.S. Pat. No. 5,779,813.

BACKGROUND OF THE INVENTION

1. Field of the Invention

The present invention relates to processes and systems for decontamination of soils, and more particularly relates to methods and systems for decontamination of poly chlorinated biphenyl contaminated soils.

2. Description of the Related Art

The problem of poly chlorinated biphenyl (PCB) pollution of soils has been a major concern for some time. Accidental spills and improper land use have left numerous sites across the United States with PCB contaminated soil sites.

Various approaches have been used in efforts to decontaminate polychlorinated biphenyl laden soils. Efforts have included in-situ bio-destruction, thermal desorption, chemical declorination/destruction, and solvent extraction and soil washing. Solvent extraction processes have usually suffered from one or more of the following problems: environment impact of the solvent, lack of efficiency in movement of the contaminant from the soil to the solvent, difficulty of removal of solvent from the soil, solvent expense, and/or difficulty of separation of solvent from the contaminate. Specific decontamination methods are disclosed in Sivavec, Decontamination of Soil and Other Particulate Matter, U.S. Pat. No. 5,427,688 Jun. 27, 1995, and Szejtli et al. Method for the Extraction of Organic Pollutants from Contaminated Soils, U.S. Pat. No. 5,425,881 issued Jun. 20, 1995, which are both incorporated herein by reference.

Consequently, there is a need for a method and apparatus (system) that solves the above problems and provides for efficient removal of polychlorinated biphenyls from soil.

SUMMARY OF INVENTION

The present invention involves a method and apparatus for the decontamination of polychlorinated biphenyl (PCB) contaminated soils. A solvent composition for use in the present method contains a primary solvent and a minor amount of a sacrificial co-solvent. The solvent composition is admixed with the soil to cause the contaminates (PCBs) to move from the soil to the to solvent thereby forming contaminated solvent. The contaminated solvent is then extracted from the soil and is distilled to separate the PCBs (and other organic pollutants) from the primary solvent. Excess solvent is removed from the soil by water rinse, and the rinse water is reclaimed for reuse. The apparatus preferably involves (a) means for separating large particles from the soil, (b) means for admixing the solvent and the soil, (c) means for separating a slurry of fines from the admixture, (d) means for separation of contaminated solvent from the fines, and (e) means for distillation of the contaminated solvent to separate the primary solvent from the pollutants and co-solvent. Preferably the separated primary solvent is reused to clean additional soil, and the waste stream contains PCB and spent co-solvent and is disposed of as waste. The present method and apparatus allow for efficient decontamination of PCB contaminated soils.

DETAILED DESCRIPTION OF THE INVENTION

Figure 1:
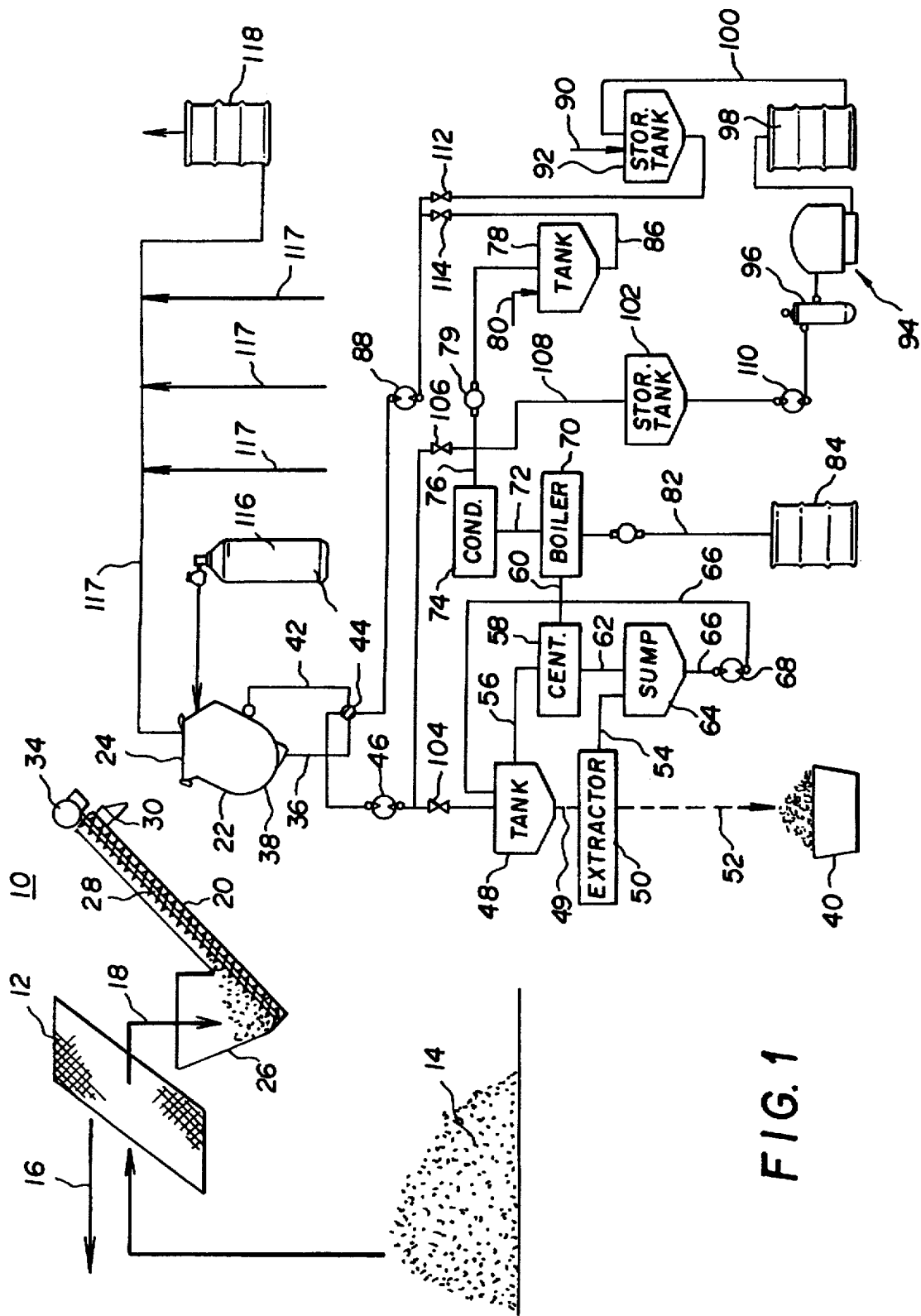
FIG. 1 is a schematic representation of the apparatus of the present invention.
Figure 2:
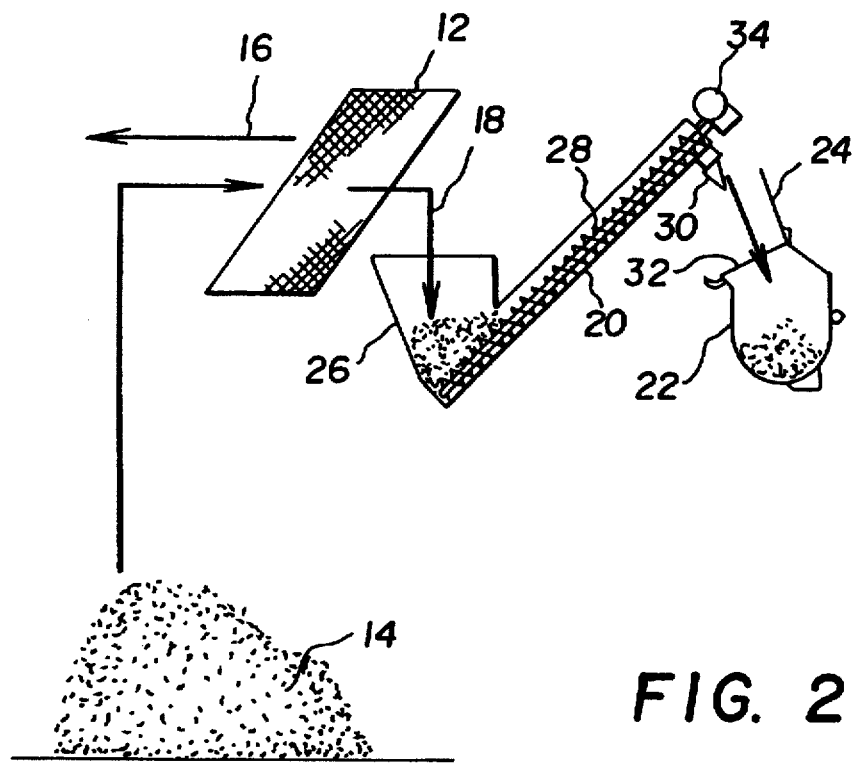
FIG. 2 is a schematic representation of the screening and mixing devices of the apparatus of FIG. 1.
Figure 3:
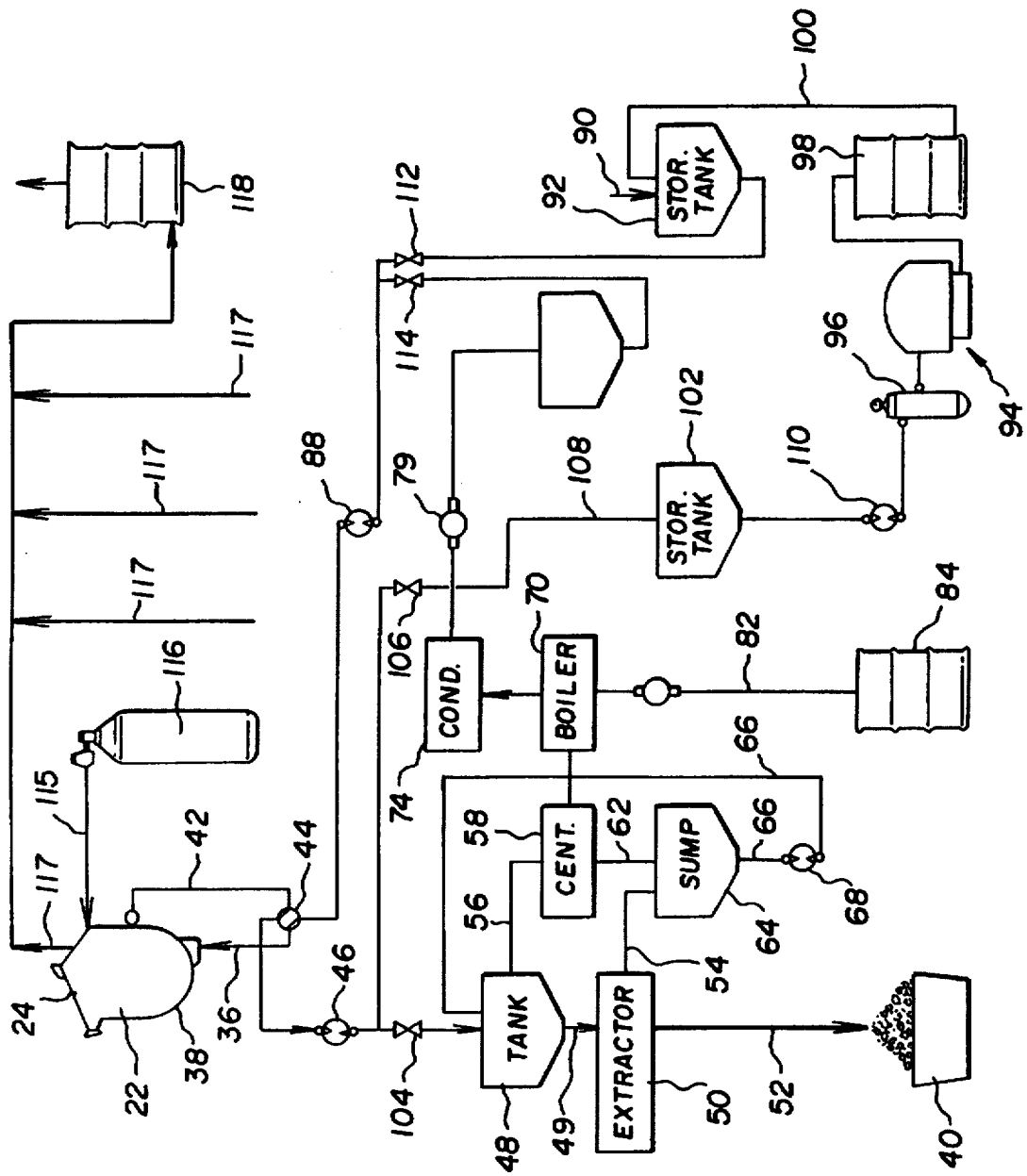
FIG. 3 is a schematic representation of mixer, centrifuge and distillation units of the apparatus of FIG. 1.

As best shown FIG. 1, the apparatus (10) comprises a screen (12) for separating initial contaminated soil mass (14) into large debris (16) and contaminated soil (18). A conveyor (20) receives soil (18) from the screen (12) and coveys the soil (18) to a mixer (22). As shown in FIG. 2, the mixer (22) has a lid (24) which may be lifted into an open position for receiving contaminated soil (18) or as shown in FIG. 3 the lid (24) may be in a closed position for treatment. The conveyor (20) may be a conventional auger type conveyor having (i) an inlet hopper (26) for receiving soil (18) from the screen (12), (ii) an auger (28) extending at an upward slope from the inlet hopper (26) to an exit shoot (30) for delivering the soil to a mouth (32) of the mixer (22). An electric motor (34) provides power for rotating the auger (28). The mouth (32) is covered and uncovered by raising and lowering of lid (24).

As best shown in FIGS. 1 and 3, the mixer lid (24) is preferably closed when admixing of the solvent composition with the contaminated soil in the mixer (22). The mixer inlet stream (36) is preferably injected into the bottom (38) of the mixer (22), and during the initial decontamination step the stream (36) is a solvent stream and at a later water wash step the stream (36) is a water stream.

The solvent composition comprises (i) a low molecular weight aliphatic alcohol preferably having from 1 to 6 carbon atoms, more preferably having from 1 to 2 carbon atoms (methanol or ethanol), and most preferably being methanol, and (ii) at least one co-solvent which is an aliphatic alcohol preferably having from 8 to 24 carbon atoms, more preferably having from 10 to 18 carbon atoms, and most preferably having 12 to 14 carbon atoms, and optionally the co-solvent may be an admixture of such alcohols having from 8 to 24 carbon atoms (for example dodecanol and tetradecanol in combination). The primary solvent is present at a relatively high level, and is preferably present at a level of from 80 to 99 percent by volume based on the total volume of the solvent composition, more preferably from 90 to 98 percent by volume thereof, and most preferably from 95 to 97 percent by volume thereof, and preferably the co-solvent is present at a level of from 1 to 20 percent by volume based on the total volume of the solvent composition, more preferably from 2 to 10 percent by volume thereof, and most preferably from 3 to 5 percent by volume thereof. The functional purpose of including the long chain alcohol co-solvents is to assist the solution of paraffin oils that might be present in the subject soil. The purpose of the short chain alcohol is to serve as an efficient solvent of PCB, for example methanol is an efficient solvent of PCBs, but is ineffective as a solvent of many of the paraffinic hydrocarbons found in soils. This combination of long and short chain alcohols has proven to be a very effective solvent of a wide range of aromatic and paraffinic hydrocarbon compounds which accounts for the vast majority of organic compounds identified as hazardous soil pollutants. The present solvent composition is much more effective than if a short chain alcohol were used alone.

In the decontamination step, mixer inlet stream (36) is solvent composition and is preferably injected into the bottom (38) of the mixer (22) for contact with the contaminated soil (18) contained in the mixer (22) to form an admixture of contaminated soil and solvent. The mixer (22) may be a paddle type mixer or other suitable type for effectively admixing the contaminated soil and solvent to force adequate contact between the soil and solvent to permit the contaminants (PCBs, oils, etc.) to migrate from the soil into the solvent. The contaminated solvent is then decanted as mixer outlet stream (42) and is in the form of a contaminated solvent slurry containing contaminated solvent and soil fines (fine soil particulates, fine fraction). The remaining solvent contacted soil (course fraction) in the mixer (22) is relatively free of PCBs due to having been washed by contact with the solvent. The contaminated solvent slurry of stream (42) is then passed through a four-way valve (44) and directed to an extraction pump (46) wherefrom the slurry is sent to a storage tank (48). A tank outlet stream (49) of solvent wet fine solids are sent from the tank (48) to an extractor (50) for separation of the decontaminated final fine fraction (40) as stream (52) from extracted solvent as stream (54). The liquid stream (56) from the tank (48) is directed to a centrifuge (58) for centrifugal separation of solvent from the fines thereby providing a centrifuge outlet solvent stream (60) and centrifuge fine outlet stream(62). Extracted solvent stream (54) and outlet fine stream (62) are both directed to a sump (64) wherefrom a sump outlet stream (66) is pumped by pump (68) as a slurry return to return solvent storage tank (48). The outlet solvent stream (60) from the centrifuge (58) is fed to a solvent boiler (70) which boils off the primary low molecular weight (short chain) aliphatic alcohol solvent from the contaminants and from the co-solvent. The primary solvent leaves the boiler (70) as a gas stream (72) and is fed to condenser (74) wherein the primary solvent gas is condensed into liquid form and exits condenser (74) as a liquid solvent stream (76) which is sent by vacuum pump (79) to a fresh solvent storage tank (78) for storage therein until needed. Co-solvent is added as co-solvent make-up stream (80) to storage tank (78) to recreate the desired solvent composition. The make-up stream (80) effectively replaces the co-solvent lost in the liquid waste stream (82) from the boiler (70) which is collected in waste container (84) for disposal. The waste stream (82) contains PCBs, oils and co-solvent. Fresh solvent composition is fed during the solvent wash stage from tank (78) as a stream (86) to an injection pump (88) which forces the stream (86) to four-way valve (44) which causes it during the solvent wash stage to become mixer inlet stream (36) for injection into the bottom (38) of mixer (22).

After the contaminated soil has been sufficiently washed with solvent to extract the contaminants from the soil, then it is necessary to wash the soil with water to remove residual solvent. The use of the present solvent composition permits efficient removal of the solvent from the soil by washing of the soil with water.

A water source stream (90) is directed to a reclaimed water storage tank (92) and serves to provide the initial desired volume of water and to provide amounts of make-up water as needed. During water washing, water is added to the mixer (22) by water being directed from storage tank (92) to injection pump (88) to valve (44) and then as mixer inlet stream (36) into the bottom (38) of mixer (22). Water is decanted from mixer (22) as mixer outlet (decant) stream (42) which is directed to pump (46) and then is routed to a return water storage tank (102) by closing a valve (104) and opening of a valve (106) as a water flow stream (108). During flow of decanted solvent from the mixer, the valve (104) is open and the valve (106) is closed. Water from return water storage tank (102) is sent by a pump (110) to a water purification system (94) which comprises a particulate filter sub-system (96) and a carbon adsorption unit (98). The purification system provides a purified water outlet stream (100) which is sent to reclaimed water storage tank (92). During water flow from tank (92) to pump (88) a valve (112) is open and a valve (114) is closed.

It may be desirable to blanket the mixer contents with an inert gas provided by inert gas tank (116) by gas inlet line (115), and gas may be vented from the mixer (22) and from other tanks and equipment (vent lines (117)) in of the apparatus to a carbon adsorption unit (118) for treatment and capture of organics prior to release to the atmosphere.

Figure 4:
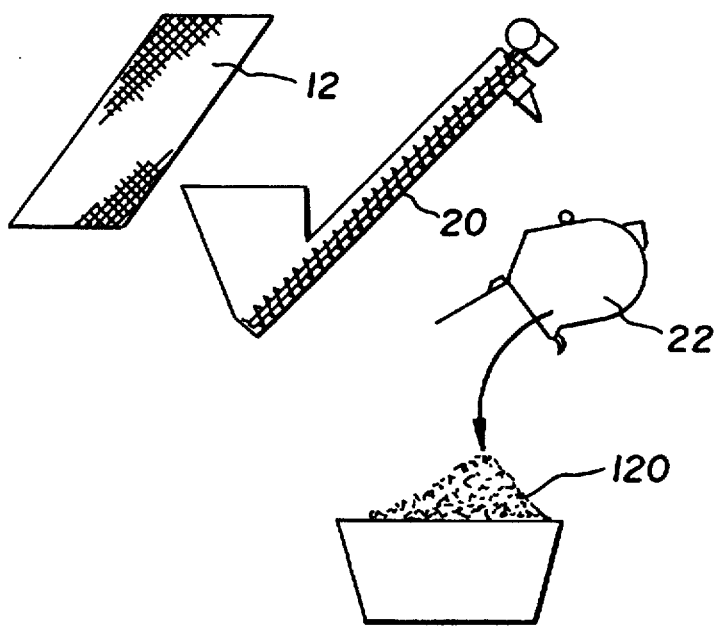
FIG. 4 is a schematic of the mixer of the apparatus of FIG. 1 in a dump position.

As best shown in FIG. 4, the decontaminated soil's water washed coarse fraction (120) may be removed from the mixer (22) by tilting of the mixer (22) for gravity dumping of the coarse fraction. Once the decontaminated soil coarse fraction (120) is removed from the mixer (22), the process may be repeated by feeding contaminated soil to the mixer (22) as shown in FIG. 3.

The present method (process) accomplishes the objectives of (a) transfer of the contaminates from the soil to an organic solvent, (b) extraction of the contaminated solvent from the soil, (c) reclamation of the primary solvent from the contaminated solvent, (d) removal of excess solvent from the soil by a fresh water rinse, and (e) reclamation of the rinse water for reuse. The method minimizes the waste stream, is environmentally sound in that no chemical reactions occur in the soil that would result in undesirable outcomes, the solvents used are effective while being relatively benign in their environmental impact.

As set out above, the contaminated soil (18) is placed in a paddle type mixer (22) where it is thoroughly mixed (admixed) with the solvent composition (classified into hydraulic equivalents) and after the desired level of admixing is achieved, the finer material is decanted as a slurry. The coarser material remains in the mixer (22) and is rewashed with clean solvent composition. Fine fractions are extracted from the liquid slurry by means of centrifuge (58) and centrifugal filter/extractor (50). For highly contaminated fines, a second wash with clean solvent composition may be required, and the extracted fine cake is re-slurried with clean solvent composition and again extracted form the solvent.

Reconditioning of the contaminated solvent is accomplished by simple distillation where the primary (principle) solvent is reclaimed and the remaining contaminates (PCBs and oils) are concentrated as still bottoms. The co-solvent (long chain aliphatic alcohol) of the solvent composition is treated as sacrificial as it is not reclaimed, but rather it becomes part of the waste stream. The co-solvent is present in a very minor amount in the solvent composition, but adds greatly to the efficacy of the solvent system while amounting to only slight amount of disposal. The spent co-solvent must be made-up by admixing new co-solvent with the reclaimed primary solvent to recreate the proper solvent composition.

The contaminated soil is first screened to remove rocks and debris, and then is introduced into a paddle type mixer (22). Fresh wash solution (solvent composition) is injected at the bottom (38) of the mixer unit (22) and the soil-solvent mixture is agitated until the clays and silt are thoroughly disassociated and are completely in slurry with the liquid solvent. As fresh solvent composition (solution) is introduced through the bottom (38), the slurry is decanted off the top through the overflow line (42). The decanted overflow is pumped to the solution recovery tank (48) where it is distributed to the fine material processing equipment, specifically the centrifuge (58) and extractor (50).

The coarse fraction, which is remaining in the mixer (22) after the fine fraction has been decanted, is treated in place by extracting the liquid in the mixer thru a bottom strainer (not shown), re-injection of fresh solution, agitation and extraction. The process is preferably repeated twice, and the coarse fraction and solvent are mixed for periods of approximately 10 minutes for each iteration to ensure adequate movement of the contaminants from the soil into the solvent solution. At the end of the mix cycle the spent solution (contaminated solvent) is withdrawn from the mixer (22) and is pumped to the solution recovery tank (48) for further processing with the fine fraction. The coarse fraction may be dewatered by utilization of a diaphragm pump (not shown) pulling through a duplex strainer (not shown) at the bottom (38) of the mixer (22). A final fresh water wash is applied with a shortened mix cycle to remove nay remaining wash solution (solvent). The wash water is then sent to a rinse water return tank (102) and is processed for reuse.

The fine fraction is generally held in slurry throughout the cleansing process. Transfer of contaminants from the solid particles of the fine fraction to the wash solution is accomplished by maximum physical disassociation of clay and silt particles by mechanical agitation, and intimate contact with a progressively fresher wash solution. The strong solvating action of the co-solvent in the solvent composition removes PCB molecules from the surface of the soil particles and carries them in solution. As the wash solution is refreshed the PCB contamination in the fine fraction is reduced.

A series of centrifugal devices may be used to separate solids from the wash solution. Then the decanted slurry is circulated from the bottom of the return solution tank and processed through a centrifugal filter/extractor and back to return solution tank, removing approximately 25% of the suspended solids each pass. The cake formed by extracted solids is periodically removed and typically contains less than 10% moisture. Simultaneously, a thinner slurry is taken from the top of the return solution tank and processed through a bowl type centrifuge, the decant liquid is collected for distillation. Collected solids are periodically backwashed to the collection sump at the centrifugal filter/extractor.

The distillation unit boiler operates under a vacuum. If methanol is employed as the primary solvent and the co-solvent is a combination of dodecanol and tetradeconal, then the distillation may be achieved at 40 degrees Celsius at 10 inches (water inches) of pressure. The bottoms (heavy liquids) of the distillation process comprise the PCBs, oils and co-solvents and are removed for disposal.

Examples of organic contaminants include hydrocarbons, especially polyaromatic hydrocarbons and their derivatives (e.g., polychlorinated derivatives), phenols and their derivatives (e.g., polychlorinated derivatives), anilines and their derivatives (e.g., polychlorinated derivatives), furanes and their derivatives (e.g., Polychlorinated derivatives), dioxines and their derivatives (e.g., polychlorinated derivatives), biphenyls and their derivatives (e.g., polychlorinated derivatives) and organic dyes. The present method is especially useful for removing poly chlorinated biphenyls.

What is claimed is:

1. An apparatus for the decontamination of soils contaminated with polychlorinated biphenyls, said apparatus comprises:

(a) a mixer for mixing said soil with a solvent comprising a short chain alcohol and a long chain alcohol, (b) means for separation of a slurry comprising soil fines and contaminated solvent from solvent wetted course soil particles, (c) means for separation of said slurry into soil fines and contaminated solvent, (d) means for separation of said solvent into said short chain alcohol and into a waste composition comprising said long chain alcohol and said polychlorinated biphenyls, (e) means for water washing said wetted course soil particles to remove residual solvent therefrom thereby creating used wash water comprising water and solvent, and (f) means for purification of said used wash water.

2. The apparatus of claim 1 wherein said mixer is a paddle mixer, said means for separation of said slurry of soil fines from said course particles is a tilt mechanism for said mixer, said means for separation of said slurry into said fines and into said contaminated solvent comprises centrifuge, and said means for separation of said short chain alcohol from said long chain alcohol and said polychlorinated biphenyl comprises a distillation unit.

* * * * *